United States Patent
Yamamoto (10) Patent No.: US 7,230,776 B2
(45) Date of Patent: Jun. 12, 2007

(54) IMAGE SCANNING LENS AND IMAGE READER THAT USES SAME

(75) Inventor: Yoko Yamamoto, Fuchu (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/345,312

(22) Filed: Feb. 2, 2006

(65) Prior Publication Data
US 2006/0203359 A1    Sep. 14, 2006

(30) Foreign Application Priority Data
Mar. 10, 2005 (JP) ............................. 2005-067567
Apr. 25, 2005 (JP) ............................. 2005-126979

(51) Int. Cl.
*G02B 9/58* (2006.01)

(52) U.S. Cl. ....................... 359/782; 359/771

(58) Field of Classification Search ............... 359/782, 359/771
See application file for complete search history.

(56) References Cited

U.S. PATENT DOCUMENTS 2,516,724 A * 7/1950 Rossinov ................. 359/753
2,730,015 A * 1/1956 Tronnier ................. 359/753
6,665,131 B2   12/2003 Suzuki et al.

FOREIGN PATENT DOCUMENTS

JP         2004-29474        1/2004

* cited by examiner

*Primary Examiner*—Scott J. Sugarman
(74) *Attorney, Agent, or Firm*—Arnold International; Jon W. Henry; Bruce Y. Arnold (57) ABSTRACT

An image scanning lens includes, arranged in order from the object side, a first lens element having negative refractive power and a meniscus shape with its convex surface on the object side, a biconvex second lens element and a biconcave third lens element that are cemented together, a stop, a biconcave fourth lens element and a biconvex fifth lens element that are cemented together, and a sixth lens element having negative refractive power and a meniscus shape with its convex surface on the image side. The image scanning lens may include only these six lens elements. The image scanning lens satisfies certain conditions related to the focal lengths of the first lens element, the second and third lens elements together, the entire image scanning lens, radii of curvature of various surfaces, and anomalous dispersion of various lens elements. An image reader with an image pickup device, such as a CCD, uses the image scanning lens.

14 Claims, 6 Drawing Sheets

Spherical Aberration
Fig. 4A

Astigmatism
Fig. 4B

Distortion
Fig. 4C

Lateral Color
Fig. 4D

Spherical Aberration
Fig. 5A

Astigmatism
Fig. 5B

Distortion
Fig. 5C

Lateral Color
Fig. 5D

Spherical Aberration
Fig. 6A

Astigmatism
Fig. 6B

Distortion
Fig. 6C

Lateral Color
Fig. 6D

Spherical Aberration
Fig. 7A

Astigmatism
Fig. 7B

Distortion
Fig. 7C

Lateral Color
Fig. 7D

Fig. 8

IMAGE SCANNING LENS AND IMAGE READER THAT USES SAME

FIELD OF THE INVENTION

The present invention relates to an image scanning lens and to an image reader, such as an image scanner or similar device, that uses such an image scanning lens.

BACKGROUND OF THE INVENTION

Image readers are known in which an image of an original color document is formed on a solid state image pickup element such as a CCD (Charge Coupled Device) via an optical system in order to read image information from the original color document. Recently, such image readers also enable reading film originals because of the remarkable progress made in providing high resolution in image readers, such as image scanners.

On the other hand, unnecessary image information such as very fine scratches and dust on a film surface are read along with the image as part of the original target information when high resolution imaging is used. Therefore, attempts have been made to detect the unnecessary image information, such as scratches and dust, by irradiating near-infrared light on the film surface and removing this unnecessary image information by electronic image processing. Accordingly, a lens that enables high resolution reading not only in the visible region but also in the near-infrared region is desired as an image scanning lens used in image readers including such a feature. Examples of such reading lenses that operate as imaging optical systems are disclosed in Japanese Laid-Open Patent Application 2002-148514 and Japanese Laid-Open Patent Application 2004-29474.

However, the imaging optical systems disclosed in the Japanese applications mentioned above have a relatively small field angle. Although this is acceptable for reading smaller film such as thirty-five millimeter film, there is a need to upgrade the lens in order to read larger film and reflecting originals (for example, about A4 size), which cannot be done with these imaging systems. Therefore, an image scanning lens having a larger field angle is desired, as well as an image scanning lens that has a smaller size and a smaller number of lens elements.

BRIEF SUMMARY OF THE INVENTION

The present invention relates to an image scanning lens that has a wide field angle while being compact and that displays good optical performance. The present invention further relates to an image reader provided with such an image scanning lens. In addition, the present invention relates to an image scanning lens that favorably corrects aberrations, especially chromatic aberration, from the visible region to the near-infrared region and an image reader provided with such an image scanning lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

An image scanning lens and an image reader using an image scanning lens according to the present invention are described below with reference to the drawings.

Figure 1:
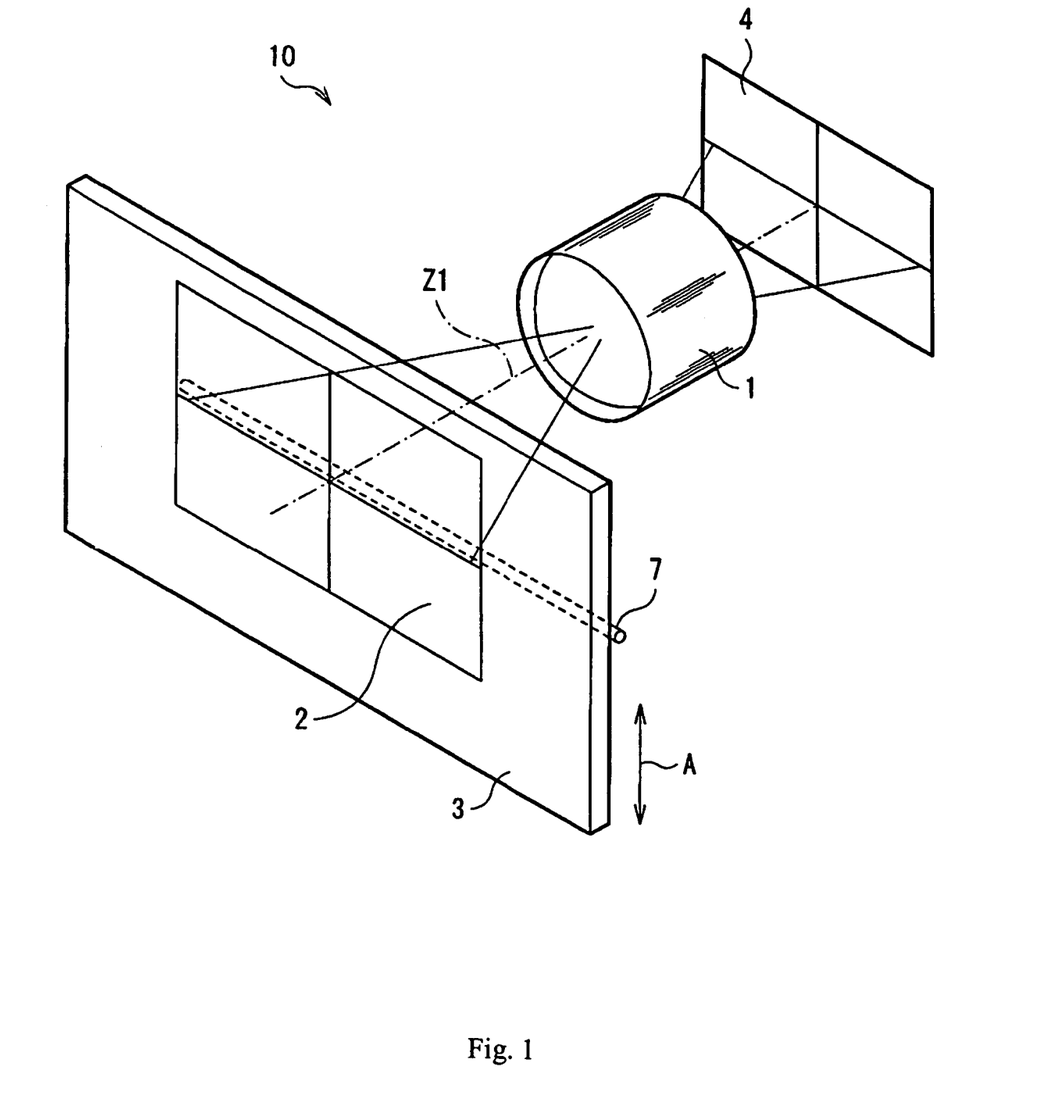
FIG. 1 shows a schematic perspective view of an image reader that uses an image scanning lens of the present invention.

FIG. 1 shows a schematic perspective view of an image reader 10 that uses an image scanning lens 1 of the present invention. The image reader 10 is a reflection-type image scanner that uses light reflected from an original document to read the document. For example, the image reader may be provided with a document mounting platform 3 where an A4 size document 2 is mounted for reading using reflected light, a line-shaped light source 7 that emits an illuminating ray to the document 2 on a document mounting platform 3, an image pickup element 4 that receives an image of the document 2, and an image scanning lens 1 arranged between the document 2 and the image pickup element 4 in order to form the image of the document 2 on an image pickup plane of the image pickup element 4. The light source 7 successively illuminates the document 2 over the entire surface but differently while the document 2 moves with the document mounting platform in the direction of the double-headed arrow A perpendicular to the linearly extending direction of the light source 7. Reflected light from the document 2 is formed into an image by the image scanning lens 1 onto the image pickup element 4 so that the image pickup element 4 receives image information.

Figure 2:
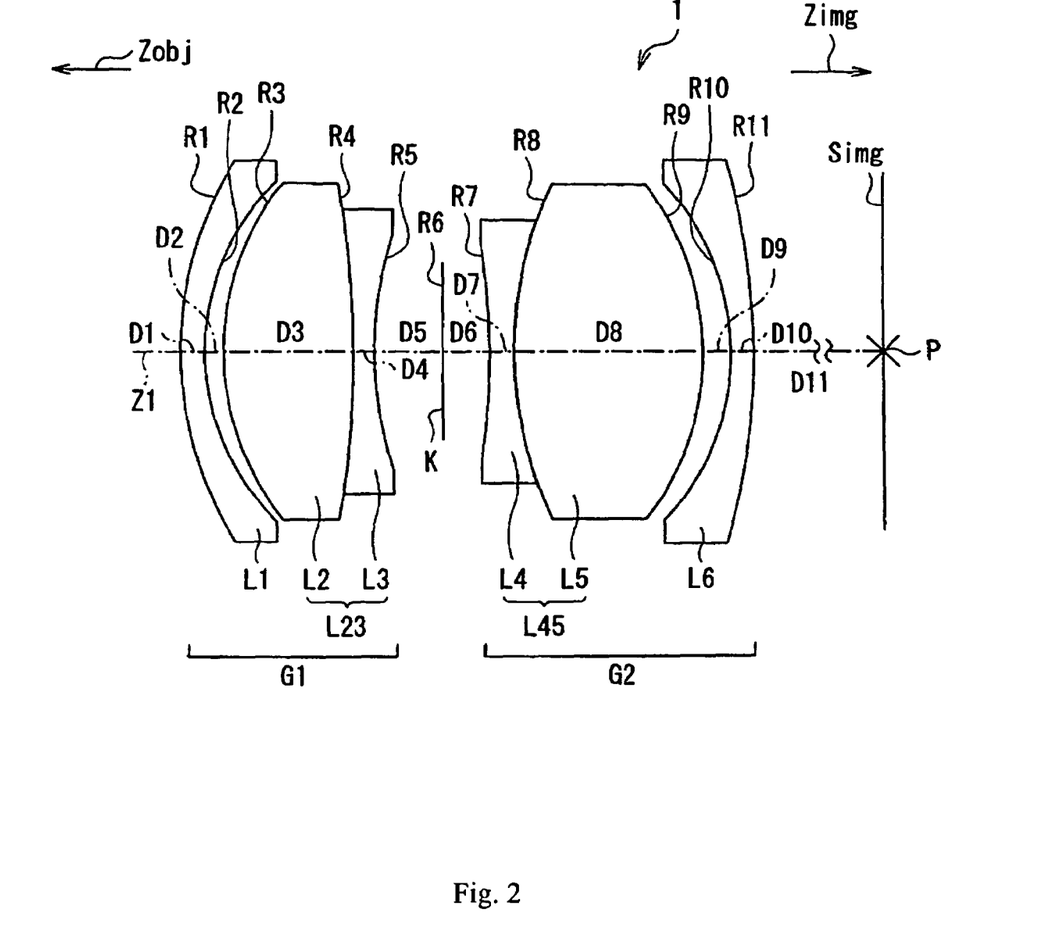
FIG. 2 shows a cross-sectional view of Embodiment 1 of the image scanning lens of the present invention.

A general description of the image scanning lens of the present invention that pertains to all four embodiments of the invention will first be described with reference to FIG. 2 that shows a cross-sectional view of Embodiment 1 of the image scanning lens of the present invention. In FIG. 2, lens elements are referenced by the letter L followed by a number denoting their order from the object side of the image scanning lens along the optical axis Z1, from L1 to L6. Similarly, radii of curvature of the surfaces of the lens elements and a diaphragm stop K that acts as an aperture stop are referenced by the letter R followed by a number denoting their order from the object side of the image scanning lens, from R1 to R11. The on-axis surface spacings along the optical axis Z1 of the various optical surfaces are referenced by the letter D followed by a number denoting their order from the object side of the image scanning lens, from D1 to D11. In the same manner, two lens groups, G1 and G2, are labeled in their order from the object side of the image scanning lens, and the optical components belonging to each lens group are indicated by straight line brackets adjacent the labels G1 and G2. Also, wavy brackets are used to denote lens components, L23 and L45, with each digit of the lens component designation being the "L" number of a lens element belonging to the particular lens component.

A horizontal arrow labeled "Zobj" at the upper left of FIG. 2 that points left indicates the object side of the image scanning lens, and a horizontal arrow labeled "Zimg" at the upper right of FIG. 2 that points right indicates the image side of the image scanning lens. In FIG. 2, reference symbol P, marked with an "X" on the image plane Simg of the image scanning lens, represents the central imaging position of the image scanning lens 1.

Definitions of the terms "lens element," "lens component," and "lens group," that relate to the following detailed description will now be given. The term "lens element" is herein defined as a single transparent mass of refractive material having two opposed refracting surfaces, which surfaces are positioned at least generally transverse to the optical axis of the image scanning lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

As shown in FIG. 2, the image scanning lens 1 of the present invention is arranged with the front group G1, a stop K, and the rear group G2 in order from the object side, and the lens elements of these lens groups have an approximately symmetrical construction about the stop K as a center. More specifically, as shown in FIG. 2, the first lens group includes a first lens component, which is first lens element L1, having negative refractive power and a meniscus shape with its convex surface on the object side, and a second lens component L23 including, arranged in order from the object side, a biconvex second lens element L2 and a biconcave third lens element L3 that are cemented together. The rear lens group G2 on the other side of the stop K includes a third lens component L45 including, arranged in order from the object side, a biconcave fourth lens element L4 and a biconvex fifth lens element L5 that are cemented together and a fourth lens component, which is sixth lens element L6, having negative refractive power and a meniscus shape with its convex surface on the image side.

This symmetry from the stop, on either side of a biconcave lens element, a biconvex lens element, and a lens element having negative refractive power and a meniscus shape with its convex surface facing outwardly (i.e., toward the object side on the object side and toward the image side on the image side), corrects distortion and lateral color particularly well while using only a small number of lens elements (e.g., in Embodiment 1, only six lens elements) while providing a wide field angle for imaging.

Preferably, the image scanning lens of the present invention satisfies the following Conditions (1)-(5) in order to better correct aberrations:

$-1.1 < f1/f < -0.5$  Condition (1)

$0.3 < f23/f < 0.7$  Condition (2)

$0.1 < R3/f < 0.3$  Condition (3)

$-2.1 < R11/R1 < -0.7$  Condition (4)

$-1.8 < R7/R5 < -0.9$  Condition (5)

where
  f1 is the focal length of the first lens element L1,
  f is the focal length of the entire image scanning lens 1,
  f23 is the composite focal length of the second lens element L2 and the third lens element L3,
  R3 is the radius of curvature of the object-side surface of the second lens element L2,
  R11 is the radius of curvature of the image-side surface of the sixth lens element L6,
  R1 is the radius of curvature of the object-side surface of the first lens element L1,
  R7 is the radius of curvature of the object-side surface of the fourth lens element L4, and
  R5 is the radius of curvature of the image-side surface of the third lens element L3.

Condition (1) prescribes the focal length of the first lens element L1. If the upper limit of Condition (1) is not satisfied, the correction of coma aberration is insufficient. If the lower limit of Condition (1) is not satisfied, the correction of field curvature is insufficient.

Condition (2) prescribes the focal length of the cemented lens component L23. If the upper limit of Condition (2) is not satisfied, the correction of axial chromatic aberration is insufficient. If the lower limit of Condition (2) is not satisfied, the correction of field curvature is insufficient.

Condition (3) prescribes the radius of curvature R3 of the object-side surface of the second lens element L2. If the upper limit of Condition (3) is not satisfied, the correction of coma aberration is insufficient. If the lower limit of Condition (3) is not satisfied, the correction of lateral color is insufficient.

Condition (4) prescribes the radius of curvature R11 of the image-side surface of the sixth lens element L6 and the radius of curvature R1 of the object-side surface of the first lens element L1. If the upper limit of Condition (4) is not satisfied, the correction of coma aberration is insufficient. If the lower limit of Condition (4) is not satisfied, the correction of field curvature is insufficient.

Condition (5) prescribes the radius of curvature R7 of the object-side surface of the fourth lens element L4 and the radius of curvature R5 of the image-side surface of the third lens element L3. If the upper limit of Condition (5) is not satisfied, the correction of distortion is insufficient. If the lower limit of Condition (5) is not satisfied, the correction of spherical aberration is insufficient.

Particularly, if the image scanning lens of the present invention is provided, for example, in an image reader so as to satisfy the above Conditions (1)-(5), the field curvature can be favorably corrected. This enables the image scanning lens to have a wide field angle. Additionally, in general terms, the image scanning lens of the present invention can have a wider field angle while achieving a compact design and obtaining an optical performance suited to performing reading of an image because the front lens group G1 and the rear lens group G2 are approximately symmetric on either side of a stop K. The aberrations are favorably corrected with good balance by satisfying Conditions (1)-(5) and by having appropriate values for the radii of curvature, refractive indexes, and various focal lengths.

Moreover, the image scanning lens and the image reader of the present invention are desirably constructed so that the material of the second lens element L2 and of the fifth lens element L5 satisfies the following Condition (6):

$$(Ng-Nd)/(NF-NC) > -2.083 \cdot 10^{-3} \cdot v_d + 1.366 \qquad \text{Condition (6)}$$

where $v_d$ is the Abbe number at the d-line ($\lambda$=587.6 nm) of the material, Ng is the refractive index at the g-line ($\lambda$=435.8 nm) of the material, Nd is the refractive index at the d-line ($\lambda$=587.6 nm) of the material, NF is the refractive index at the F-line ($\lambda$=486.1 nm) of the material, and NC is the refractive index at the C-line ($\lambda$=656.3 nm) of the material.

Furthermore, the image scanning lens and the image reader of the present invention are desirably constructed so that the material of at least one of the first lens element L1 and the sixth lens element L6 satisfies the following Condition (7):

$$(Ng-Nd)/(NF-NC) < -2.083 \cdot 10^{-3} \cdot v_d + 1.364 \qquad \text{Condition (7)}$$

where $v_d$, Ng, Nd, NF and NC are as defined above.

Figure 3:
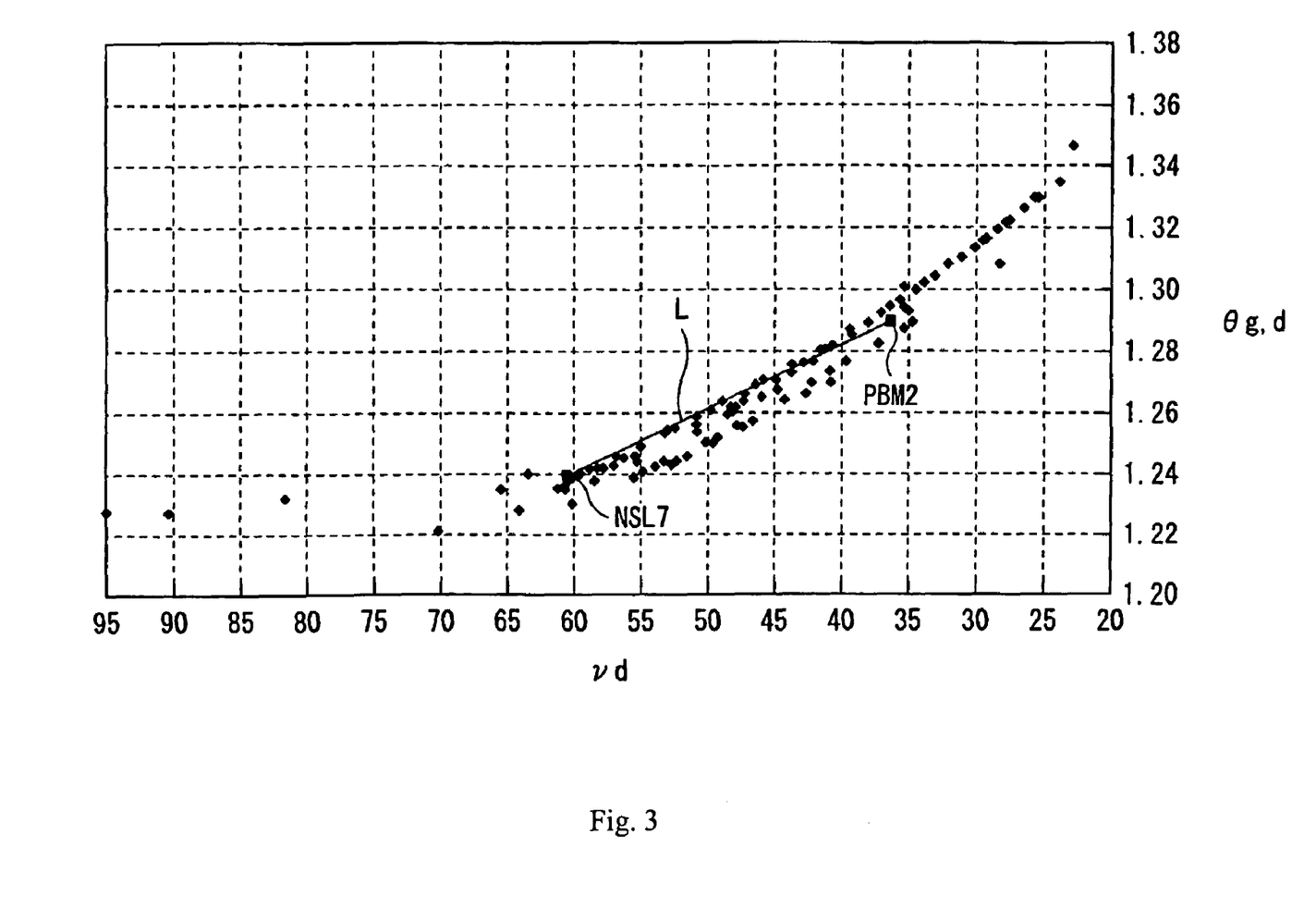
FIG. 3 shows a graph of the partial dispersion ratio $\theta g,d$ of a glass material that forms part of the image scanning lens of FIG. 2.

The value $(Ng-Nd)/(NF-NC)$ is the partial dispersion ratio $\theta g,d$ of the g-line ($\lambda$=435.8 nm) to the d-line ($\lambda$=587.6 nm) of the material. Generally, if a graph of $\theta g,d$ versus $v_d$ is plotted by plotting the partial dispersion ratio $\theta g,d$ on the vertical axis and the Abbe number $v_d$ on the horizontal axis, it has been known that many glass materials have a characteristic distribution along a given reference line on the graph. The more the glass deviates from the given reference line, the more the glass has anomalous dispersion. More specifically, as shown in FIG. 3, a reference line L is obtained by selecting two glass materials NSL7 and PBM2 of OHARA Co. as reference glasses. The reference line L is obtained by plotting the values of $\theta g,d$ and $v_d$ for the glass materials NSL7 and PBM2 and connecting the plotted points. This reference line L may be expressed by the following equation:

$$\theta g,d = (Ng-Nd)/(NF-NC) = -2.083 \times 10^{-3} \cdot v_d + 1.365.$$

The anomalous dispersion $\delta\theta g,d$ for a given glass is the distance that the plotted value of $\theta g,d$ and $v_d$ for that glass differs from the reference line L. The anomalous dispersion of a glass is a value described in catalogs and similar reference materials of glass makers and is an inherent value of each glass.

In the image scanning lens of the present invention, the axial chromatic aberration and the lateral color, particularly, can be corrected better by constructing the second lens element L2 and the fifth lens element L5 with a glass that satisfies Condition (6) above. Moreover, the axial chromatic aberration and the lateral color, particularly, can be corrected even better by constructing at least one of the first lens element L1 and the sixth lens element L6 with a glass that satisfies Condition (7) above. Additionally, the image scanning lens of the present invention displays favorable optical performance from the visible region to the near-infrared region.

Embodiments 1-4 of the present invention will now be individually described with further reference to the drawings.

EMBODIMENT 1

FIG. 2 shows a cross-sectional view of Embodiment 1 of the image scanning lens of the present invention.

Table 1 below lists the surface number # in order from the object side, the radius of curvature R (in mm) of each surface, the on-axis surface spacing D (in mm), the refractive index Nd (at the d-line), the refractive index Ng (at the g-line), the refractive index NF (at the F-line), the refractive index NC (at the C-line), the refractive index N(850) (at 850 nm), and the product name that the manufacturer (OHARA) uses to identify the optical material used to make each lens element for Embodiment 1. Listed in the middle portion of Table 1 are the surface number # in order from the object side, the Abbe number $v_d$ (at the d-line), the partial dispersion ratio $\theta g,d$, the right side of Condition (6) above, and the right side of Condition (7) above for the optical material (other than air) on the image side of the given surface for Embodiment 1. Furthermore, listed in the bottom portion of Table 1 are the focal length f, the f-number $F_{NO}$, the magnification $\beta$, the maximum field angle $2\omega$, the values corresponding to Conditions (1)-(5) for Embodiment 1, and the lens elements related to satisfying Conditions (6) and (7).

TABLE 1

| # | R | D | Nd | Ng | NF | NC | N(850) | Optical Material |
|---|---|---|----|----|----|----|--------|------------------|
| 1 | 13.83 | 0.88 | 1.61340 | 1.63091 | 1.62311 | 1.60925 | 1.60212 | S-NBM51 |
| 2 | 8.95 | 0.70 | | | | | | |
| 3 | 10.15 | 4.87 | 1.61800 | 1.63010 | 1.62479 | 1.61504 | 1.60987 | S-PHM52 |
| 4 | −34.62 | 0.79 | 1.51742 | 1.52980 | 1.52431 | 1.51444 | 1.50929 | S-NSL36 |
| 5 | 14.73 | 2.59 | | | | | | |
| 6 | ∞(stop) | 1.78 | | | | | | |
| 7 | −24.47 | 0.90 | 1.48749 | 1.49596 | 1.49229 | 1.48534 | 1.48142 | S-FSL5 |
| 8 | 15.24 | 7.01 | 1.61800 | 1.63010 | 1.62479 | 1.61504 | 1.60987 | S-PHM52 |
| 9 | −10.34 | 1.07 | | | | | | |
| 10 | −9.23 | 0.89 | 1.54814 | 1.56335 | 1.55654 | 1.54457 | 1.53849 | S-TIL1 |
| 11 | −24.97 | | | | | | | |

TABLE 1-continued

| # | $v_d$ | θg, d | Right side of Condition (6) | Right Side of Condition (7) |
|---|------|-------|-----------------------------|------------------------------|
| 1 | 44.3 | 1.26335 | 1.27372 | 1.27172 |
| 2 | | | | |
| 3 | 63.4 | 1.24103 | 1.23394 | 1.23194 |
| 4 | 52.4 | 1.25431 | 1.25685 | 1.25485 |
| 5 | | | | |
| 6 | | | | |
| 7 | 70.1 | 1.21871 | 1.21998 | 1.21798 |
| 8 | 63.4 | 1.24103 | 1.23394 | 1.23194 |
| 9 | | | | |
| 10 | 45.8 | 1.27068 | 1.27060 | 1.26860 |
| 11 | | | | | f = 47.3 mm   $F_{NO}$ = 6.0   β = −0.25   2ω = 48.6°

Condition (1) value: f1/f = −0.93
Condition (2) value: f23/f = 0.59
Condition (3) value: R3/f = 0.21
Condition (4) value: R11/R1 = −1.80
Condition (5) value: R7/R5 = −1.66
Condition (6) lenses: L2 and L5
Condition (7) lens: L1

Embodiment 1 satisfies Conditions (1)-(5). Additionally, lens elements L2 and L5 of Embodiment 1 satisfy Condition (6) above and lens element L1 of Embodiment 1 satisfies Condition (7) above.

Figures 4A, 4B:
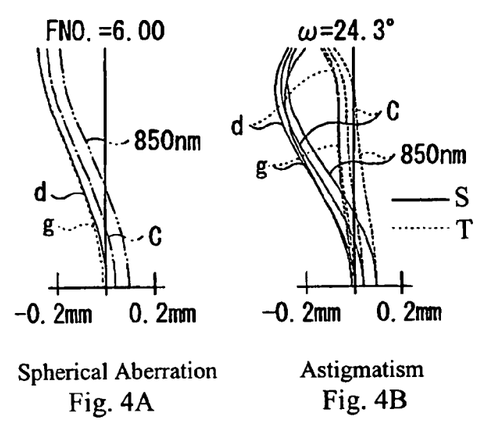
FIGS. 4A-4D show the spherical aberration, astigmatism, distortion, and lateral color, respectively, of the image scanning lens according to Embodiment 1.
Figures 4C, 4D:
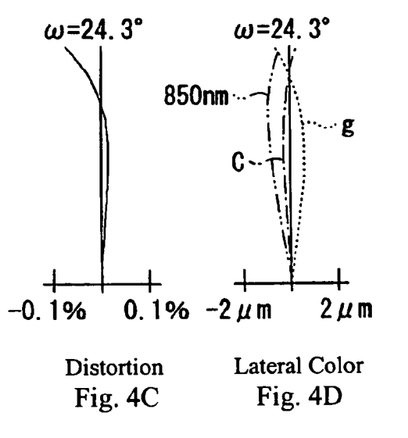

FIGS. 4A-4D show the spherical aberration, astigmatism, distortion, and lateral color, respectively, of the image scanning lens of Embodiment 1. These aberration diagrams are based on a plane parallel glass plate with a thickness of 2.8 mm being arranged in the optical path on the object side of the image scanning lens as well as a plane parallel glass plate with a thickness of 0.7 mm being arranged in the optical path on the image side of the image scanning lens. As shown in FIG. 4A, the spherical aberration is shown at an f-number, $F_{NO}$, of 6.00. In FIGS. 4A and 4B, aberrations are shown for the d-line, the g-line, the C-line, and 850 nm (near-infrared light). In FIG. 4B, the astigmatism is shown for the sagittal image surface S and for the tangential image surface T for each wavelength. In FIG. 4C, distortion (in per cent) is shown for the d-line. In FIG. 4D, lateral color is shown for the C-line, the g-line, and 850 nm (near-infrared light) relative to the d-line. The half-field angle ω for FIGS. 4B-4D is 24.3°. As is apparent from these figures, the various aberrations are favorably corrected.

EMBODIMENT 2

Embodiment 2 of the image scanning lens of the present invention is very similar to Embodiment 1 and is well shown by FIG. 2 that shows a cross-sectional view of Embodiment 1 of the image scanning lens of the present invention.

Table 2 below lists the surface number # in order from the object side, the radius of curvature R (in mm) of each surface, the on-axis surface spacing D (in mm), the refractive index Nd (at the d-line), the refractive index Ng (at the g-line), the refractive index NF (at the F-line), the refractive index NC (at the C-line), the refractive index N(850) (at 850 nm), and the product name that the manufacturer (OHARA) uses to identify the optical material used to make each lens element for Embodiment 2. Listed in the middle portion of Table 2 are the surface number # in order from the object side, the Abbe number $v_d$ (at the d-line), the partial dispersion ratio θg,d, the right side of Condition (6) above, and the right side of Condition (7) above for the optical material (other than air) on the image side of the given surface for Embodiment 2. Furthermore, listed in the bottom portion of Table 2 are the focal length f, the f-number $F_{NO}$, the magnification β, the maximum field angle 2ω, the values corresponding to Conditions (1)-(5) for Embodiment 2, and the lens elements related to satisfying Conditions (6) and (7).

TABLE 2

| # | R | D | Nd | Ng | NF | NC | N(850) | Optical Material |
|---|------|------|---------|---------|---------|---------|---------|---------|
| 1 | 18.35 | 1.42 | 1.54814 | 1.56335 | 1.55654 | 1.54457 | 1.53849 | S-TIL1 |
| 2 | 8.76 | 0.89 | | | | | | |
| 3 | 9.60 | 5.38 | 1.61800 | 1.63010 | 1.62479 | 1.61504 | 1.60987 | S-PHM52 |
| 4 | −19.61 | 0.95 | 1.51823 | 1.52916 | 1.52435 | 1.51556 | 1.51086 | S-NSL3 |
| 5 | 17.63 | 1.70 | | | | | | |
| 6 | ∞(stop) | 2.01 | | | | | | |
| 7 | −20.27 | 1.08 | 1.48749 | 1.49596 | 1.49229 | 1.48534 | 1.48142 | S-FSL5 |
| 8 | 14.96 | 6.67 | 1.60300 | 1.61438 | 1.60940 | 1.60019 | 1.59523 | S-PHM53 |
| 9 | −10.15 | 0.86 | | | | | | |
| 10 | −8.93 | 0.89 | 1.61340 | 1.63091 | 1.62311 | 1.60925 | 1.60212 | S-NBM51 |
| 11 | −17.99 | | | | | | | |

TABLE 2-continued

| # | $v_d$ | θg, d | Right side of Condition (6) | Right Side of Condition (7) |
|---|---|---|---|---|
| 1 | 45.8 | 1.27068 | 1.27060 | 1.26860 |
| 2 | | | | |
| 3 | 63.4 | 1.24103 | 1.23394 | 1.23194 |
| 4 | 59.0 | 1.24346 | 1.24310 | 1.24110 |
| 5 | | | | |
| 6 | | | | |
| 7 | 70.1 | 1.21871 | 1.21998 | 1.21798 |
| 8 | 65.5 | 1.23561 | 1.22956 | 1.22756 |
| 9 | | | | |
| 10 | 44.3 | 1.26335 | 1.27372 | 1.27172 |
| 11 | | | | | f = 47.3 mm   $F_{NO}$ = 6.0   β = −0.25   2ω = 49.1°

Condition (1) value: f1/f = −0.68
Condition (2) value: f23/f = 0.45
Condition (3) value: R3/f = 0.20
Condition (4) value: R11/R1 = −0.98
Condition (5) value: R7/R5 = −1.15
Condition (6) lenses: L2 and L5
Condition (7) lens: L6

Embodiment 2 satisfies Conditions (1)-(5). Additionally, lens elements L2 and L5 of Embodiment 2 satisfy Condition (6) above and lens element L6 of Embodiment 2 satisfies Condition (7) above.

Figures 5A, 5B:
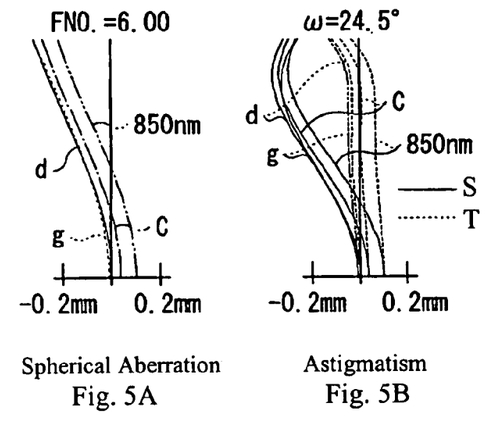
FIGS. 5A-5D show the spherical aberration, astigmatism, distortion, and lateral color, respectively, of the image scanning lens according to Embodiment 2.
Figures 5C, 5D:
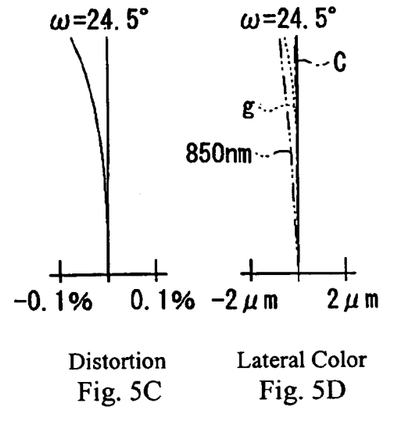

FIGS. 5A-5D show the spherical aberration, astigmatism, distortion, and lateral color, respectively, of the image scanning lens of Embodiment 2. These aberration diagrams are based on a plane parallel glass plate with a thickness of 2.8 mm being arranged in the optical path on the object side of the image scanning lens as well as a plane parallel glass plate with a thickness of 0.7 mm being arranged in the optical path on the image side of the image scanning lens. As shown in FIG. 5A, the spherical aberration is shown at an f-number, $F_{NO}$, of 6.00. In FIGS. 5A and 5B, aberrations are shown for the d-line, the g-line, the C-line, and 850 nm (near-infrared light). In FIG. 5B, the astigmatism is shown for the sagittal image surface S and for the tangential image surface T for each wavelength. In FIG. 5C, distortion (in per cent) is shown for the d-line. In FIG. 5D, lateral color is shown for the C-line, the g-line, and 850 nm (near-infrared light) relative to the d-line. The half-field angle ω for FIGS. 5B-5D is 24.5°. As is apparent from these figures, the various aberrations are favorably corrected.

EMBODIMENT 3

Embodiment 3 of the image scanning lens of the present invention is very similar to Embodiment 1 and is well shown by FIG. 2 that shows a cross-sectional view of Embodiment 1 of the image scanning lens of the present invention.

Table 3 below lists the surface number # in order from the object side, the radius of curvature R (in mm) of each surface, the on-axis surface spacing D (in mm), the refractive index Nd (at the d-line), the refractive index Ng (at the g-line), the refractive index NF (at the F-line), the refractive index NC (at the C-line), the refractive index N(850) (at 850 nm), and the product name that the manufacturer (OHARA, except where labeled otherwise) uses to identify the optical material used to make each lens element for Embodiment 3. Listed in the middle portion of Table 3 are the surface number # in order from the object side, the Abbe number $v_d$ (at the d-line), the partial dispersion ratio θg,d, the right side of Condition (6) above, and the right side of Condition (7) above for the optical material (other than air) on the image side of the given surface for Embodiment 3. Furthermore, listed in the bottom portion of Table 3 are the focal length f, the f-number $F_{NO}$, the magnification β, the maximum field angle 2ω, the values corresponding to Conditions (1)-(5) for Embodiment 3, and the lens elements related to satisfying Conditions (6) and (7).

TABLE 3

| # | R | D | Nd | Ng | NF | NC | N(850) | Optical Material |
|---|---|---|---|---|---|---|---|---|
| 1 | 18.69 | 2.21 | 1.54814 | 1.56335 | 1.55654 | 1.54457 | 1.53849 | S-TIL1 |
| 2 | 8.27 | 0.78 | | | | | | |
| 3 | 9.10 | 5.40 | 1.60300 | 1.61438 | 1.60940 | 1.60019 | 1.59523 | S-PHM53 |
| 4 | −16.92 | 0.76 | 1.51680 | 1.52667 | 1.52237 | 1.51432 | 1.50984 | BSC7 (HOYA) |
| 5 | 18.23 | 1.38 | | | | | | |
| 6 | ∞(stop) | 2.31 | | | | | | |
| 7 | −20.33 | 0.96 | 1.48749 | 1.49596 | 1.49229 | 1.48534 | 1.48142 | S-FSL5 |
| 8 | 14.63 | 6.26 | 1.60300 | 1.61438 | 1.60940 | 1.60019 | 1.59523 | S-PHM53 |
| 9 | −9.73 | 0.90 | | | | | | |
| 10 | −8.65 | 0.90 | 1.61340 | 1.63091 | 1.62311 | 1.60925 | 1.60212 | S-NBM51 |
| 11 | −17.70 | | | | | | | |

TABLE 3-continued

| # | $v_d$ | θg, d | Right side of Condition (6) | Right Side of Condition (7) |
|---|---|---|---|---|
| 1 | 45.8 | 1.27068 | 1.27060 | 1.26860 |
| 2 | | | | |
| 3 | 65.5 | 1.23561 | 1.22956 | 1.22756 |
| 4 | 64.2 | 1.22609 | 1.23227 | 1.23027 |
| 5 | | | | |
| 6 | | | | |
| 7 | 70.1 | 1.21871 | 1.21998 | 1.21798 |
| 8 | 65.5 | 1.23561 | 1.22956 | 1.22756 |
| 9 | | | | |
| 10 | 44.3 | 1.26335 | 1.27372 | 1.27172 |
| 11 | | | | |

| f = 47.3 mm | $F_{NO}$ = 6.0 | β = −0.25 | 2ω = 49.1° |
|---|---|---|---|

| Condition (1) value: | f1/f = −0.62 |
|---|---|
| Condition (2) value: | f23/f = 0.43 |
| Condition (3) value: | R3/f = 0.19 |
| Condition (4) value: | R11/R1 = −0.95 |
| Condition (5) value: | R7/R5 = −1.11 |
| Condition (6) lenses: | L2 and L5 |
| Condition (7) lens: | L6 |

Embodiment 3 satisfies Conditions (1)-(5). Additionally, lens elements L2 and L5 of Embodiment 3 satisfy Condition (6) above and lens element L6 of Embodiment 3 satisfies Condition (7) above.

Figures 6A, 6B:
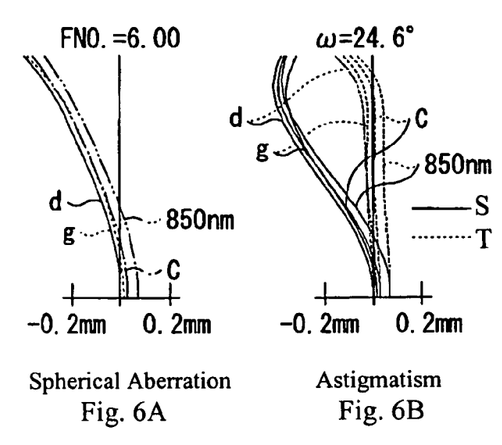
FIGS. 6A-6D show the spherical aberration, astigmatism, distortion, and lateral color, respectively, of the image scanning lens according to Embodiment 3.
Figures 6C, 6D:
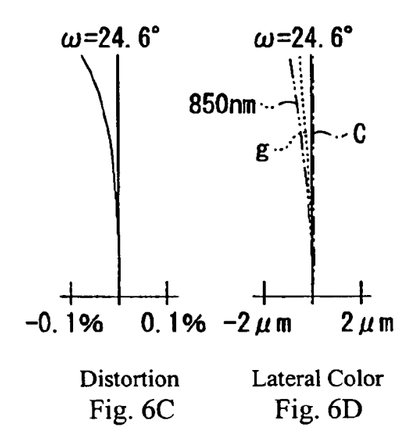

FIGS. 6A-6D show the spherical aberration, astigmatism, distortion, and lateral color, respectively, of the image scanning lens of Embodiment 3. These aberration diagrams are based on a plane parallel glass plate with a thickness of 2.8 mm being arranged in the optical path on the object side of the image scanning lens as well as a plane parallel glass plate with a thickness of 0.7 mm being arranged in the optical path on the image side of the image scanning lens. As shown in FIG. 6A, the spherical aberration is shown at an f-number, $F_{NO}$, of 6.00. In FIGS. 6A and 6B, aberrations are shown for the d-line, the g-line, the C-line, and 850 nm (near-infrared light). In FIG. 6B, the astigmatism is shown for the sagittal image surface S and for the tangential image surface T for each wavelength. In FIG. 6C, distortion (in per cent) is shown for the d-line. In FIG. 6D, lateral color is shown for the C-line, the g-line, and 850 nm (near-infrared light) relative to the d-line. The half-field angle ω for FIGS. 6B-6D is 24.6°. As is apparent from these figures, the various aberrations are favorably corrected.

EMBODIMENT 4

Embodiment 4 of the image scanning lens of the present invention is very similar to Embodiment 1 and is well shown by FIG. 2 that shows a cross-sectional view of Embodiment 1 of the image scanning lens of the present invention.

Table 4 below lists the surface number # in order from the object side, the radius of curvature R (in mm) of each surface, the on-axis surface spacing D (in mm), the refractive index Nd (at the d-line), the refractive index Ng (at the g-line), the refractive index NF (at the F-line), the refractive index NC (at the C-line), the refractive index N(850) (at 850 nm), and the product name that the manufacturer (OHARA) uses to identify the optical material used to make each lens element for Embodiment 4. Listed in the middle portion of Table 4 are the surface number # in order from the object side, the Abbe number $v_d$ (at the d-line), the partial dispersion ratio θg,d, the right side of Condition (6) above, and the right side of Condition (7) above for the optical material (other than air) on the image side of the given surface for Embodiment 4. Furthermore, in the bottom portion of Table 4 are the focal length f, the f-number $F_{NO}$, the magnification β, maximum field angle 2ω, the values corresponding to Conditions (1)-(5) for Embodiment 4, the lens elements related to satisfying Condition (6).

TABLE 4

| # | R | D | Nd | Ng | NF | NC | N(850) | Optical Material |
|---|---|---|---|---|---|---|---|---|
| 1 | 15.19 | 0.89 | 1.54814 | 1.56335 | 1.55654 | 1.54457 | 1.53849 | S-TIL1 |
| 2 | 9.29 | 0.74 | | | | | | |
| 3 | 10.75 | 5.87 | 1.61800 | 1.63010 | 1.62479 | 1.61504 | 1.60987 | S-PHM52 |
| 4 | −30.87 | 0.76 | 1.51742 | 1.52980 | 1.52431 | 1.51444 | 1.50929 | S-NSL36 |
| 5 | 15.06 | 2.06 | | | | | | |
| 6 | ∞(stop) | 1.92 | | | | | | |
| 7 | −24.48 | 0.76 | 1.48749 | 1.49596 | 1.49229 | 1.48534 | 1.48142 | S-FSL5 |
| 8 | 15.48 | 7.01 | 1.61800 | 1.63010 | 1.62479 | 1.61504 | 1.60987 | S-PHM52 |
| 9 | −9.92 | 0.81 | | | | | | |
| 10 | −9.07 | 0.89 | 1.54814 | 1.56335 | 1.55654 | 1.54457 | 1.53849 | S-TIL1 |
| 11 | −24.64 | | | | | | | |

TABLE 4-continued

| # | $v_d$ | θg, d | Right side of Condition (6) | Right Side of Condition (7) |
|---|---|---|---|---|
| 1 | 45.8 | 1.27068 | 1.27060 | 1.26860 |
| 2 | | | | |
| 3 | 63.4 | 1.24103 | 1.23394 | 1.23194 |
| 4 | 52.4 | 1.25431 | 1.25685 | 1.25485 |
| 5 | | | | |
| 6 | | | | |
| 7 | 70.1 | 1.21871 | 1.21998 | 1.21798 |
| 8 | 63.4 | 1.24103 | 1.23394 | 1.23194 |
| 9 | | | | |
| 10 | 45.8 | 1.27068 | 1.27060 | 1.26860 |
| 11 | | | | | f = 47.3 mm   $F_{NO}$ = 6.0   β = −0.25   2ω = 48.8°

Condition (1) value:  f1/f = −0.97
Condition (2) value:  f23/f = 0.62
Condition (3) value:  R3/f = 0.23
Condition (4) value:  R11/R1 = −1.62
Condition (5) value:  R7/R5 = −1.63
Condition (6) lenses: L2 and L5

Embodiment 4 satisfies Conditions (1)-(5). Additionally, lens elements L2 and L5 of Embodiment 4 satisfy Condition (6) above.

Figures 7A, 7B:
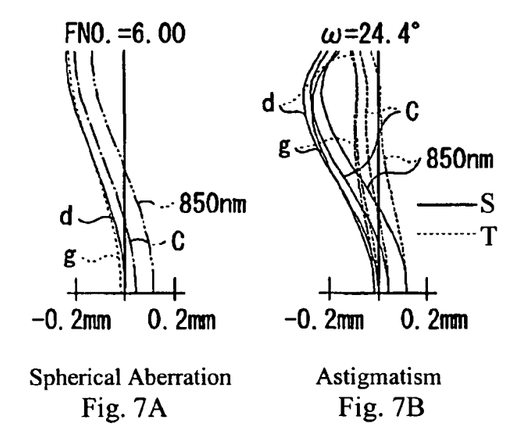
FIGS. 7A-7D show the spherical aberration, astigmatism, distortion, and lateral color, respectively, of the image scanning lens according to Embodiment 4.
Figures 7C, 7D:
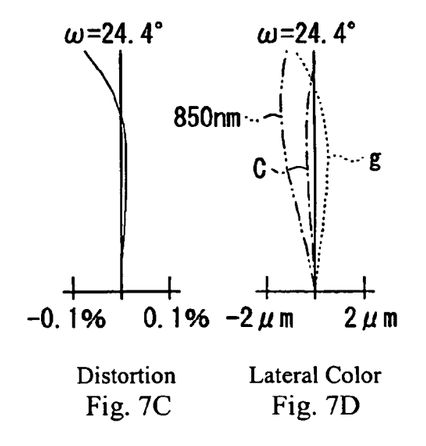

FIGS. 7A-7D show the spherical aberration, astigmatism, distortion, and lateral color, respectively, of the image scanning lens of Embodiment 4. These aberration diagrams are based on a plane parallel glass plate with a thickness of 2.8 mm being arranged in the optical path on the object side of the image scanning lens as well as a plane parallel glass plate with a thickness of 0.7 mm being arranged in the optical path on the image side of the image scanning lens. As shown in FIG. 7A, the spherical aberration is shown at an f-number, $F_{NO}$, of 6.00. In FIGS. 7A and 7B, aberrations are shown for the d-line, the g-line, the C-line, and 850 nm (near-infrared light). In FIG. 7B, the astigmatism is shown for the sagittal image surface S and for the tangential image surface T for each wavelength. In FIG. 7C, distortion (in per cent) is shown for the d-line. In FIG. 7D, lateral color is shown for the C-line, the g-line, and 850 nm (near-infrared light) relative to the d-line. The half-field angle ω for FIGS. 7B-7D is 24.4°. As is apparent from these figures, the various aberrations are favorably corrected.

As is evident from the above optical element data and the figures described above, in the image scanning lens of the present invention, as exemplified in all of Embodiments 1-4 described above, the first through sixth lens elements, L1-L6, are symmetrically arranged along the optical axis Z1 about the stop K as a center and are constructed so as to satisfy Conditions (1)-(6) above, confirming that a wide field angle is ensured while obtaining a compact construction, aberration corrections can be well made from the visible region to the near-infrared region, and good performance suitable for image reading is obtained. In addition, the first lens element L1 satisfies Condition (7) in Embodiment 1 described above and the sixth lens element L6 satisfies Condition (7) in Embodiments 2 and 3 described above, thereby particularly improving the correction of lateral color.

The present invention is not limited to the aforementioned embodiments, as it will be obvious that various alternative implementations are possible. For instance, values such as the radius of curvature R of each of the lens elements, the surface spacings D, the refractive indexes Nd, Ng, NF, NC, N(850), as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the claims that follow this detailed description.

Figure 8:
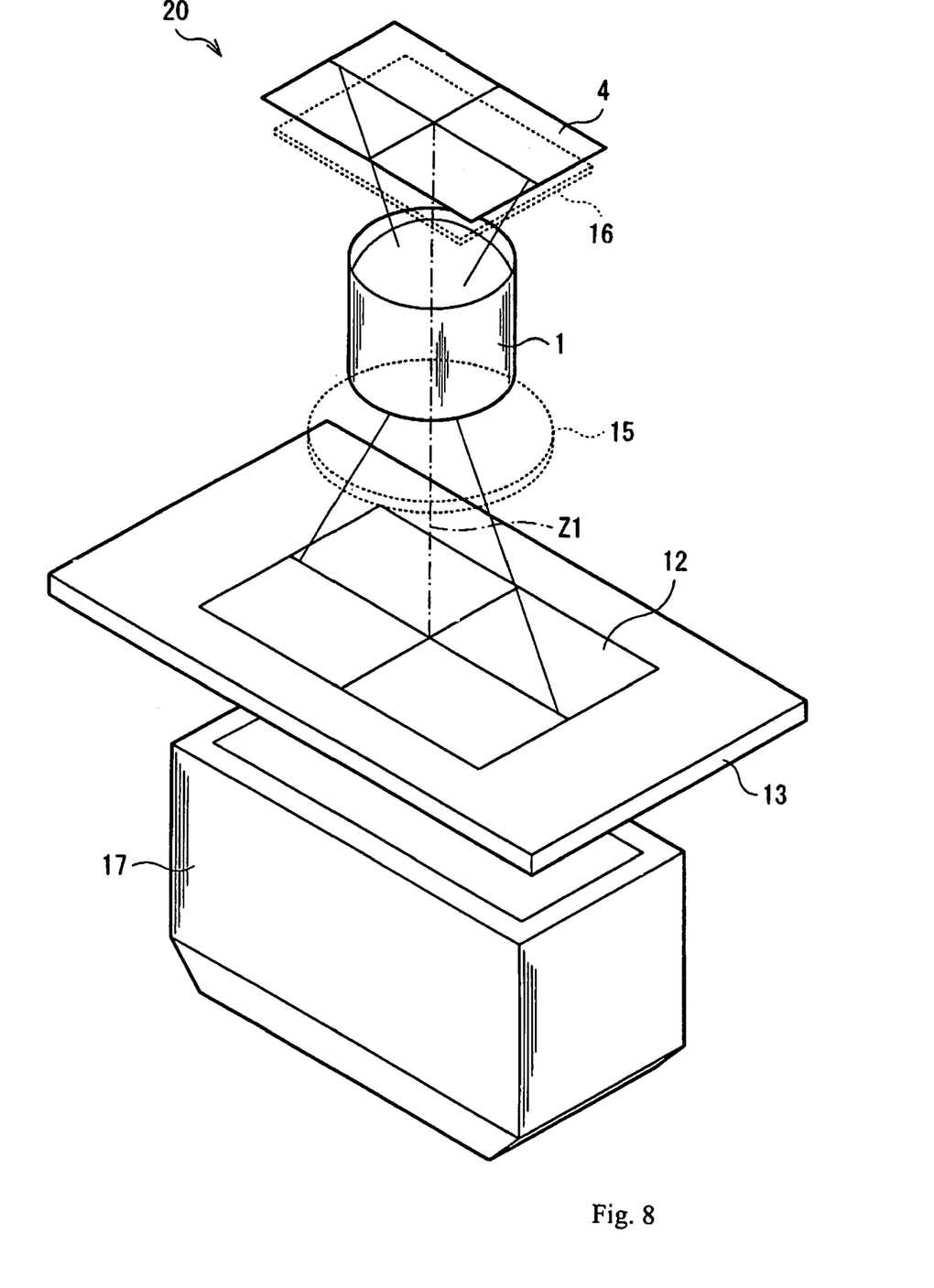
FIG. 8 shows a schematic perspective view of a modified image reader that uses an image scanning lens of the present invention.

Furthermore, the image scanning lens of the present invention may be used in various reading devices of the present invention. Although the image scanning lens of the present invention was described above, with reference to FIG. 1, and in a reflection-type image scanner that uses light reflected from a document to read the document, the present invention is not restricted to such. For example, as shown in FIG. 8, an image reader using a transmissive document may also be used. As shown in FIG. 8, an image reader 20 is provided with a document mounting platform 13 where a transmissive document 12, such as a film negative, a transmissive positive film, or a similar transmissive member, is mounted. A light source 17 emits illuminating light to the document mounting platform 13, an image pickup element 4 picks up an image of the transmissive document 12 and an image scanning lens 1 forms an image of the transmissive document 12 on the image pickup plane of the image pickup element 4. The image pickup element 4 consists of, for example, a CCD. If necessary, an optical element 15, such as a document cover glass for pressing the transmissive document 12 onto the document mounting platform 13 may be used. Additionally, other optical elements, such as filters, may be arranged between the transmissive document 12 and the image scanning lens 1. If desired, an optical element 16, such as a cover glass for protecting the image pickup element 4, can be arranged between the image scanning lens 1 and the image pickup element 4. In this image reader 20, illuminating light is irradiated from the light source 17 to the transmissive document 12. Light transmitted through the transmissive original 12 is formed into an image of the transmissive original on the image pickup element 4 by the image scanning lens 1 so that the image is obtained by the image pickup element 4.

Thus the image reader of the present invention, like the image scanning lens of the present invention, may be varied in numerous ways as long as it is provided with an image scanning lens of the present invention so that the image reader provides high quality image information to the image pickup device from the image scanning lens of the present invention.

What is claimed is:

1. An image scanning lens comprising, arranged in order from the object side:
    a first lens element having negative refractive power and a meniscus shape with its convex surface on the object side;
    a biconvex second lens element and a biconcave third lens element that are cemented together;
    a stop;
    a biconcave fourth lens element and a biconvex fifth lens element that are cemented together; and
    a sixth lens element having negative refractive power and a meniscus shape with its convex surface on the image side;
wherein the following conditions are satisfied:

$$-1.1 < f1/f < -0.5$$

$$0.3 < f23/f < 0.7$$

$$0.1 < R3/f < 0.3$$

$$-2.1 < R11/R1 < -0.7$$

$$-1.8 < R7/R5 < -0.9$$

where
  f1 is the focal length of said first lens element,
  f is the focal length of the entire image scanning lens,
  f23 is the composite focal length of said second lens element and said third lens element,
  R3 is the radius of curvature of the object-side surface of said second lens element,
  R11 is the radius of curvature of the image-side surface of said sixth lens element,
  R1 is the radius of curvature of the object-side surface of said first lens element,
  R7 is the radius of curvature of the object-side surface of said fourth lens element, and
  R5 is the radius of curvature of the image-side surface of said third lens element.

2. The image scanning lens of claim 1, wherein each of said second lens element and said fifth lens element is made of a material that satisfies the following condition:

$$(Ng-Nd)/(NF-NC) > -2.083 \cdot 10^{-3} \cdot v_d + 1.366$$

where
  $v_d$ is the Abbe number at the d-line (λ=587.6 nm) of said material,
  Ng is the refractive index at the g-line (λ=435.8 nm) of said material,
  Nd is the refractive index at the d-line (λ=587.6 nm) of said material,
  NF is the refractive index at the F-line (λ=486.1 nm) of said material, and
  NC is the refractive index at the C-line (λ=656.3 nm) of said material.

3. The image scanning lens of claim 1, wherein at least one of said first lens element and said sixth lens element is made of a material that satisfies the following condition:

$$(Ng-Nd)/(NF-NC) < -2.083 \cdot 10^{-3} \cdot v_d + 1.364$$

where
  $v_d$ is the Abbe number at the d-line (λ=587.6 nm) of said material,
  Ng is the refractive index at the g-line (λ=435.8 nm) of said material,
  Nd is the refractive index at the d-line (λ=587.6 nm) of said material,
  NF is the refractive index at the F-line (λ=486.1 nm) of said material, and
  NC is the refractive index at the C-line (λ=656.3 nm) of said material.

4. The image scanning lens of claim 1, wherein the image scanning lens includes only six lens elements.

5. The image scanning lens of claim 2, wherein the image scanning lens includes only six lens elements.

6. The image scanning lens of claim 3, wherein the image scanning lens includes only six lens elements.

7. The image scanning lens of claim 1, in combination with an image reader that includes an image pickup device for receiving an image formed by the image scanning lens.

8. The image scanning lens of claim 4, in combination with an image reader that includes an image pickup device for receiving an image formed by the image scanning lens.

9. An image scanning lens comprising, arranged in order from the object side;
    a first lens element having negative refractive power and a meniscus shape with its convex surface on the object side;
    a biconvex second lens element and a biconcave third lens element that are cemented together;
    a stop;
    a biconcave fourth lens element and a biconvex fifth lens element that are cemented together; and
    a sixth lens element having negative refractive power and a meniscus shape with its convex surface on the image side; wherein
    each of said second lens element and said fifth lens element is made of a material that satisfies the following condition:

$$(Ng-Nd)/(NF-NC) > -2.083 \cdot 10^{-3} \cdot v_d + 1.366$$

where
  $v_d$ is the Abbe number at the d-line (λ=587.6 nm) of said material,
  Ng is the refractive index at the g-line (λ=435.8 nm) of said material,
  Nd is the refractive index at the d-line (λ=587.6 nm) of said material,
  NF is the refractive index at the F-line (λ=486.1 nm) of said material, and
  NC is the refractive index at the C-line (λ=656.3 nm) of said material.

10. The image scanning lens of claim 9, wherein the image scanning lens includes only six lens elements.

11. The image scanning lens of claim 9, in combination with an image reader that includes an image pickup device for receiving an image formed by the image scanning lens.

12. An image scanning lens comprising, arranged in order from the object side;
    a first lens element having negative refractive power and a meniscus shape with its convex surface on the object side;
    a biconvex second lens element and a biconcave third lens element that are cemented together;
    a stop;
    a biconcave fourth lens element and a biconvex fifth lens element that are cemented together; and a sixth lens element having negative refractive power and a meniscus shape with its convex surface on the image side; wherein at least one of said first lens element and said sixth lens element is made of a material that satisfies the following condition:

$$(Ng-Nd)/(NF-NC) < -2.083 \cdot 10^{-3} \cdot v_d + 1.364$$

where $v_d$ is the Abbe number at the d-line ($\lambda$=587.6 nm) of said material, Ng is the refractive index at the g-line ($\lambda$=435.8 nm) of said material, Nd is the refractive index at the d-line ($\lambda$=587.6 nm) of said material, NF is the refractive index at the F-line ($\lambda$=486.1 nm) of said material, and NC is the refractive index at the C-line ($\lambda$=656.3 nm) of said material.

13. The image scanning lens of claim 12, wherein the image scanning lens includes only six lens elements.

14. The image scanning lens of claim 12, in combination with an image reader that includes an image pickup device for receiving an image formed by the image scanning lens.

* * * * *